(12) United States Patent
Rumpf et al.

(10) Patent No.: US 6,886,365 B2
(45) Date of Patent: May 3, 2005

(54) FIBER OPTIC FABRY-PEROT INTERFEROMETER AND ASSOCIATED METHODS

(75) Inventors: Raymond C. Rumpf, Melbourne, FL (US); Syed H. Murshid, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 119 days.

(21) Appl. No.: 10/287,192

(22) Filed: Nov. 4, 2002

(65) Prior Publication Data

US 2004/0086228 A1 May 6, 2004

(51) Int. Cl.[7] .......................... G02B 6/26; C03B 37/023; G01B 9/02
(52) U.S. Cl. ............................. 65/385; 385/50; 385/51; 356/477; 356/506; 356/519
(58) Field of Search ............................. 65/385; 385/50, 385/51; 356/460–521

(56) References Cited

U.S. PATENT DOCUMENTS

| | | | |
|---|---|---|---|
| 4,444,460 A | 4/1984 | Stowe | 350/96 |
| 4,830,451 A | 5/1989 | Stone | 350/96.15 |
| 5,528,367 A * | 6/1996 | Putnam et al. | 356/480 |
| 5,682,237 A | 10/1997 | Belk | |
| 5,714,680 A | 2/1998 | Taylor et al. | |
| 6,445,838 B1 * | 9/2002 | Caracci et al. | 385/14 |

FOREIGN PATENT DOCUMENTS

DE           3929453 C       3/1991

* cited by examiner

*Primary Examiner*—Akm Enayet Ullah
*Assistant Examiner*—Jerry T Rahll
(74) *Attorney, Agent, or Firm*—Allen, Dyer, Doppelt, Milbrath & Gilchrist, P.A.

(57) ABSTRACT

The method for making the fiber optic Fabry-Perot sensor includes securing an optical fiber to a substrate, and forming at least one gap in the optical fiber after the optical fiber is secured to the substrate to define at least one pair of self-aligned opposing spaced apart optical fiber end faces for the Fabry-Perot sensor. Preferably, an adhesive directly secures the at least one pair of optical fiber portions to the substrate. The opposing spaced apart optical fiber end faces are self-aligned because the pair of optical fiber end portions are formed from a single fiber which has been directly secured to the substrate. Also, each of the self-aligned spaced apart optical fiber end faces may be substantially rounded due to an electrical discharge used to form the gap. This results in integral lenses being formed as the end faces of the fiber portions.

25 Claims, 3 Drawing Sheets

FIBER OPTIC FABRY-PEROT INTERFEROMETER AND ASSOCIATED METHODS

FIELD OF THE INVENTION

The present invention relates to optical sensors, and more particularly, to fiber optic fabry-perot interferometers.

BACKGROUND OF THE INVENTION

The Fabry-Perot Interferometer (FPI) is described by C. Fabry and A. Perot in 1897 (Ann. Chem. Phys., 12:459–501) and is widely used in a variety of applications of optical systems. The basic structure and operation of the FPI sensor is well-known in the art and is described in many physics and optics texts. This interferometer includes an optical cavity formed between two typically reflecting, low-loss, partially transmitting mirrors.

The use of optical fibers allows for the manufacture of extremely compact and economic sensors known as Fiber-optic Fabry-Perot interferometric (FFPI) sensors. Ends of optical fiber portions form partially reflective surfaces with the cavity or gap therebetween. Changing the distance between optic fiber ends in the cavity or stretching an optical fiber in the cavity changes the intensity of the combined optical intensity due to interference. The sensor can be designed to sense, for example, acoustic noise, stress/strain, temperature, vibration, shock etc.

The fibers must be very accurately aligned and able to maintain that alignment during operation. This is typically an expensive and timely process that involves either an active alignment or a passive alignment. The active alignment typically includes launching light into one fiber while maximizing the light coupled into the second fiber. The fibers are aligned in three planes and at a plurality of angles. In a conventional passive alignment, fibers are inserted into a small microcapillary tube and glued in place. These processes are also difficult to automate.

Thus, there is a need for a fiber optic Fabry-Perot interferometric sensor which is less expensive to produce. The process of making the interferometer should be easily automated and involve a less timely alignment of the fibers.

SUMMARY OF THE INVENTION

In view of the foregoing background, it is therefore a feature of the invention to provide a fiber optic Fabry-Perot interferometric sensor which is less expensive to produce via an easily automated and less timely process.

This and other features and advantages in accordance with the present invention are provided by a method for making a fiber optic Fabry-Perot sensor including securing an optical fiber to a substrate, and forming at least one gap in the optical fiber after the optical fiber is secured to the substrate to define at least one pair of self-aligned opposing spaced apart optical fiber end faces for the Fabry-Perot sensor. No alignment is needed because forming the gap in a single fiber which has been secured to the substrate results in the opposing end faces of the optical fiber portions being self-aligned.

The substrate preferably has a characteristic which is changeable, e.g. in response to a sensed condition. Also, the gap changes in response to changes in the characteristic of the substrate. Forming the gap may include forming the gap so that the at least one pair of spaced apart optical fiber end faces are substantially parallel. The substrate may be made of a material with a predetermined coefficient of thermal expansion, and may include a flexible material. The gap may be formed with an electrical discharge, by cleaving, or by chemical etching, for example. When cutting the fiber with an electrical discharge, the end faces of the remaining fiber portions adjacent the gap may be melted to form integral lenses.

The optical fiber is preferably a single mode optical fiber and includes an optical core, and may include a cladding surrounding the core. Furthermore, an optical source and an optical detector are preferably coupled to the optical fiber. Also, the optical fiber is preferably secured to the substrate with an adhesive.

Features and advantages in accordance with the present invention are also provided by a fiber optic Fabry-Perot sensor including a substrate having a characteristic which is changeable, and at least one pair of optical fiber portions aligned in end-to-end relation and defining a gap between at least one pair of self-aligned opposing spaced apart optical fiber end faces. Preferably, an adhesive directly secures the at least one pair of optical fiber portions to the substrate. The opposing spaced apart optical fiber end faces are self-aligned because the pair of optical fiber end portions are formed from a single fiber which preferably has been directly secured to the substrate. Also, each of the self-aligned spaced apart optical fiber end faces may be substantially rounded due to an electrical discharge used to form the gap. This results in integral lenses being formed as the end faces of the fiber portions.

Again, the gap changes in response to changes in the characteristic of the substrate, and the substrate may include at least one flat surface to which the at least one pair of optical fiber portions are secured thereto. Each of the self-aligned spaced apart optical fiber end faces may be substantially parallel, and the substrate may be formed of a flexible material. Also, each of the optical fiber portions may comprise a single mode optical fiber, or at least one of the fiber portions may be multimode.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. The dimensions of layers and regions may be exaggerated in the figures for clarity.

Figure 1:
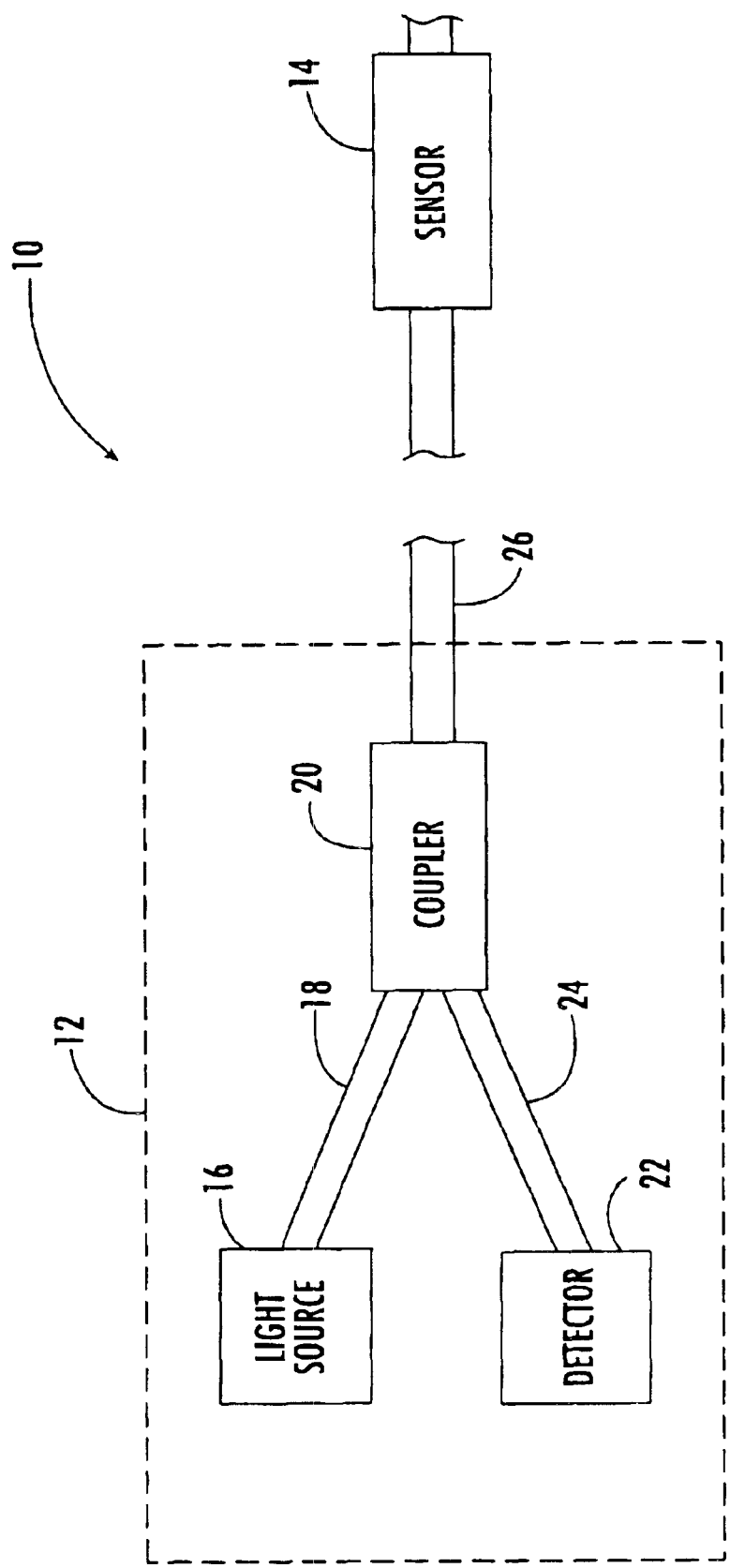
FIG. 1 is schematic diagram of a fiber-optic Fabry-Perot interferometric (FFPI) sensor system in accordance with the present invention.
Figure 2:
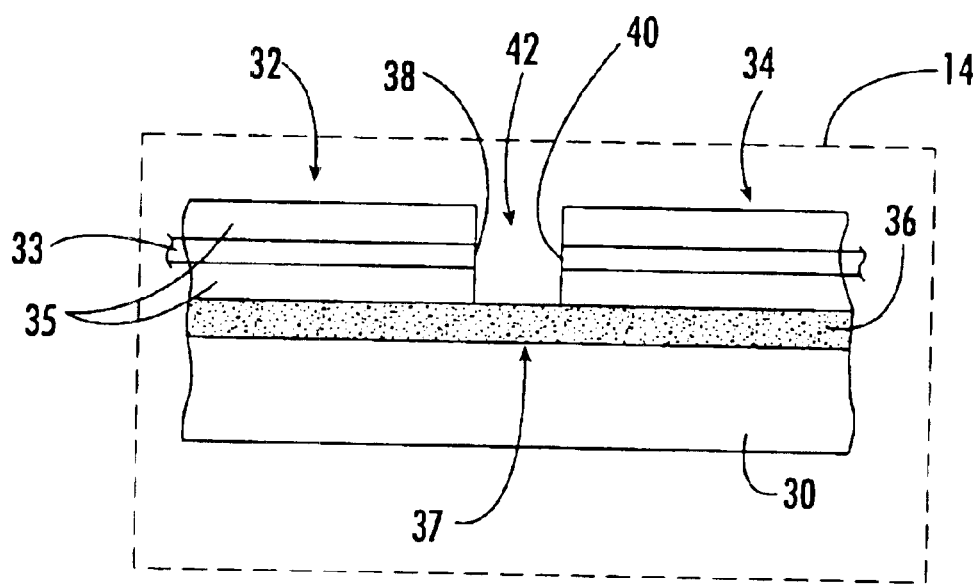
FIG. 2 is a cross-sectional view of a sensor of the FFPI sensor system of FIG. 1.

Referring to FIGS. 1 and 2, a fiber-optic Fabry-Perot interferometric (FFPI) sensor system 10 will now be described. The system 10 includes a control and signal processor 12 coupled to a FFPI sensor 14 via fiber optic cable 26. The sensor 14 can be located kilometers away from the processor 12, and requires no electrical power. The processor 12 includes light source 16, such as a laser diode. Radiation or light from the light source 16 is coupled to the fiber 18 and propagates through the coupler 20 to the fiber 26. At the sensor 14, some radiation is reflected back into the fiber 26 through the coupler 20 and into the optical detector 22, as will be explained in detail below. The fibers 18, 24 and 26 are preferably single mode fibers as would be readily appreciated by the skilled artisan.

As previously discussed, a typical interferometer includes an optical cavity formed between two typically reflecting, low-loss, partially transmitting mirrors. Lenses are typically used to collimate divergent optical beams. Fiber-optic Fabry-Perot interferometric (FFPI) sensors are extremely compact and economic because of the use of optical fibers. Ends of optical fiber portions form partially reflective surfaces with the cavity or gap therebetween. Changing the distance between optic fiber ends in the cavity or stretching an optical fiber in the cavity changes the intensity of the optical radiation. The sensor can be designed to sense, for example, acoustic noise, stress/strain, temperature, vibration, shock etc.

The fibers must be very accurately aligned and able to maintain that alignment during operation. Conventionally, this is an expensive and timely process that involves aligning the fibers in three planes and at a plurality of angles. In a conventional passive alignment, fibers are inserted into a small microcapillary tube and glued in place. Both of these processes are also difficult to automate. The sensor 14 of the present invention does not need any alignment process because the resulting opposing fiber portions are automatically self-aligned.

The sensor 14 will be described in greater detail with reference to FIG. 2. The sensor 14 includes a structure or substrate 30 having a characteristic which is changeable. For example, the substrate 30 may be a flexible substrate. The sensor 14 also includes a pair of optical fiber portions 32, 34 aligned in end-to-end relation. A gap 42 is defined by the pair of self-aligned opposing spaced apart optical fiber end faces 38 and 40. The end faces form partially reflective surfaces for the Fabry-Perot sensor 14. Preferably, an adhesive 36 directly secures the optical fiber portions 32, 34 to the substrate 30. Each of the optical fiber portions 32, 34 may comprise a single mode optical fiber having a core 33 surrounded by cladding 35. Of course the sensor 14 may also include multiple gaps defined by three more fiber portions as would be appreciated by the skilled artisan.

Figure 6:
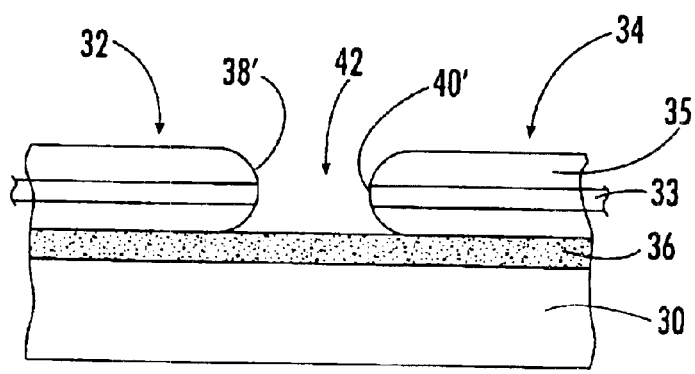
FIG. 6 is a cross-sectional view illustrating an alternative embodiment of the sensor of FIG. 2.

The opposing spaced apart optical fiber end faces 38, 40 are self-aligned because the pair of optical fiber end portions 32, 34 are formed from a single fiber which preferably has been directly secured to the substrate 30 as will be further described below. In an alternative embodiment, as illustrated in FIG. 6, each of the self-aligned spaced apart optical fiber end faces 38', 40' may be substantially rounded due to an electrical discharge used to form the gap as will also be described below. The lenses collimate divergent optical beams for processing through the sensor 14.

As discussed, the gap 42 changes in response to changes in the characteristic of the substrate 30. The substrate 30 may include at least one flat surface 37 to which the at least one pair of optical fiber portions 32, 34 are secured thereto. Each of the self-aligned spaced apart optical fiber end faces 38, 40 may be substantially parallel.

When laser light is guided into the sensor 14 via the light source 16 and coupler 20, a portion of the light is reflected by each of the partially reflective end faces 38, 40 generating an interference effect. The interference is created constructively (reflections in phase) or destructively (reflections out of phase). When reflections are in phase, the reflected output is at a maximum. When reflections are out of phase, the reflected output is at a minimum. The phase shift is a result of changes in the length of the gap 42 or cavity with respect to the wavelength of light.

If the input beam from the light source 16 passes from the fiber portion 32 to fiber portion 34, then the reflection from the reflective end face 38 back into the fiber portion 32 may be referred to as the reference beam. Likewise, the reflection from the end face 40 back across the gap 42 and into the fiber portion 32 may be referred to as the signal beam. The intensity (I) of the combined signal and reference beams is a function of the phase modulation in the gap 42. Thus, nanometer scale changes in the gap 42 length L can be detected.

Figure 3:
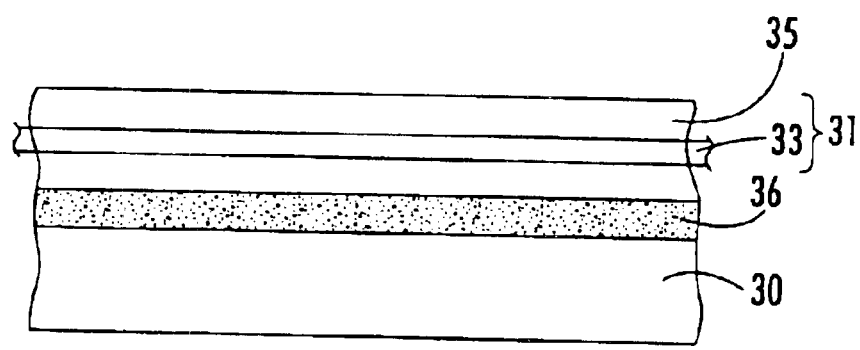
FIGS. 3–5 are cross-sectional views illustrating various steps in making the sensor of FIG. 2.
Figure 4:
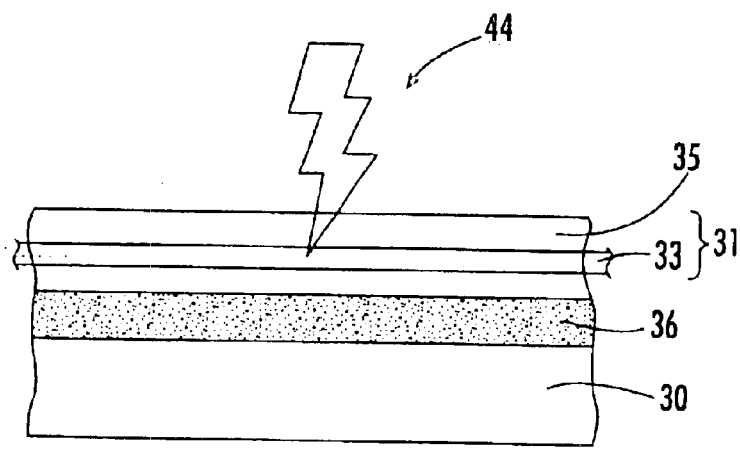
Figure 5:
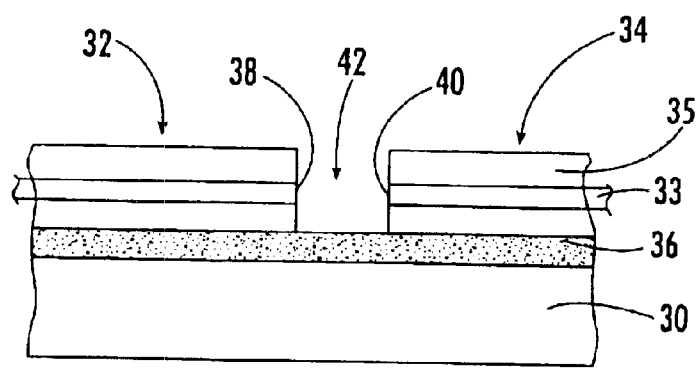

A method of making the sensor 14 will now be described with reference to FIGS. 3–5. First, an optical fiber 31 is secured to the substrate 30, for example, by an adhesive layer 36. The optical fiber is typically, but not necessarily, a single mode fiber and typically includes a core 33 surrounded by cladding 35. The fiber 31 is preferably secured to the substrate with an adhesive as would be appreciated by the skilled artisan. As can be seen in FIGS. 4 and 5, a gap 42 is formed in the optical fiber 31 after the optical fiber is secured to the substrate 30. The gap may be formed with an electrical discharge 44, by cleaving, or by chemical etching, for example.

A pair of fiber portions 32, 34 are created from the fiber 31, and a pair of spaced apart optical fiber end faces 38, 40 oppose each other with the gap 42 therebetween. The end faces 38, 40 form the partially reflective surfaces for the Fabry-Perot sensor 14. Moreover, the fiber portions 32, 34 and the respective end faces 38, 40 are inherently aligned or self-aligned due to the gap 42 being formed in a single fiber 31 which has been secured to the substrate 30. Thus, no active alignment or the use of a microcapillary tube is necessary.

The substrate 30 preferably has a characteristic which is changeable, e.g. in response to a sensed condition such as, for example, acoustic noise, stress/strain, temperature, vibration, pressure, flow, shock etc., as would be appreciated by those skilled in the art. The substrate 30 may be made of a material with a predetermined coefficient of thermal expansion, and may include a flexible material. Also, the length of the gap 42 changes in response to changes in the characteristic of the substrate 30. Forming the gap 42 may include forming the gap so that the at least one pair of spaced apart optical fiber end faces 38, 40 are substantially parallel.

When cutting the fiber 31 with an electrical discharge 44, the end faces 38', 40' of the remaining fiber portions 32, 34 adjacent the gap 42 may be melted to form integral lenses, as can be seen in FIG. 6. The lenses collimate divergent optical beams for processing through the sensor 14.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for making a fiber optic Fabry-Perot sensor comprising:

securing an optical fiber to a substrate having a characteristic which is changeable in response to a sensed condition; and forming at least one gap in the optical fiber after the optical fiber is secured to the substrate to define at least one pair of self-aligned opposing spaced apart optical fiber end faces for the Fabry-Perot sensor, and wherein the at least one gap changes in response to changes in the characteristic of the substrate.

2. A method according to claim 1 wherein forming the at least one gap comprises forming the at least one gap so that the at least one pair of spaced apart optical fiber end faces are substantially parallel.

3. A method according to claim 1 wherein the substrate comprises a material with a predetermined coefficient of thermal expansion.

4. A method according to claim 1 wherein the substrate comprises a piezoelectric material.

5. A method according to claim 1 wherein forming the at least one gap comprises forming the at least one gap using an electrical discharge.

6. A method according to claim 1 wherein forming the at least one gap comprises forming the at least one gap by cleaving.

7. A method according to claim 1 wherein forming the at least one gap comprises forming the at least one gap by chemical etching.

8. A method according to claim 1 wherein the optical fiber comprises an optical core and a cladding surrounding the core.

9. A method according to claim 1 wherein the optical fiber comprises a single mode optical fiber.

10. A method according to claim 1 further comprising coupling at least one optical source and at least one optical detector to the optical fiber.

11. A method according to claim 1 wherein securing the optical fiber comprises adhesively securing the optical fiber to the substrate.

12. A method for making a fiber optic Fabry-Perot sensor comprising:

securing a single mode optical fiber to a substrate having a characteristic which is changeable in response to a sensed condition; and forming at least one gap in the single mode optical fiber after the single mode optical fiber is secured to the substrate to define at least one pair of self-aligned opposing spaced apart substantially parallel optical fiber end faces for the Fabry-Perot sensor, and wherein the at least one gap changes in response to changes in the characteristic of the substrate.

13. A method according to claim 12 wherein the substrate comprises a flexible substrate.

14. A method according to claim 12 wherein forming the at least one gap comprises forming the at least one gap using an electrical discharge.

15. A method according to claim 12 wherein forming the at least one gap comprises forming the at least one gap by cleaving.

16. A method according to claim 12 wherein forming the at least one gap comprises forming the at least one gap by chemical etching.

17. A method for making a fiber optic Fabry-Perot interferometer comprising:

securing an optical fiber to a substrate; and forming at least one gap in the optical fiber after the optical fiber is secured to the substrate to define at least one pair of self-aligned opposing spaced apart optical fiber end faces for the Fabry-Perot interferometer.

18. A method according to claim 17 wherein forming the at least one gap comprises forming the at least one gap so that the at least one pair of spaced apart optical fiber end faces are substantially parallel.

19. A method according to claim 17 wherein the substrate comprises a flexible substrate.

20. A method according to claim 17 wherein forming the at least one gap comprises forming the at least one gap using an electrical discharge.

21. A method according to claim 20 wherein forming the at least one gap using an electrical discharge comprises forming integral lenses as the self-aligned opposing spaced apart optical fiber end faces.

22. A method according to claim 17 wherein forming the at least one gap comprises forming the at least one gap by cleaving.

23. A method according to claim 17 wherein forming the at least one gap comprises forming the at least one gap by chemical etching.

24. A method according to claim 17 wherein the optical fiber comprises a single mode optical fiber.

25. A method according to claim 17 wherein securing the optical fiber comprises adhesively securing the optical fiber to the substrate.

* * * * *